United States Patent Office 3,269,689
Patented August 30, 1966

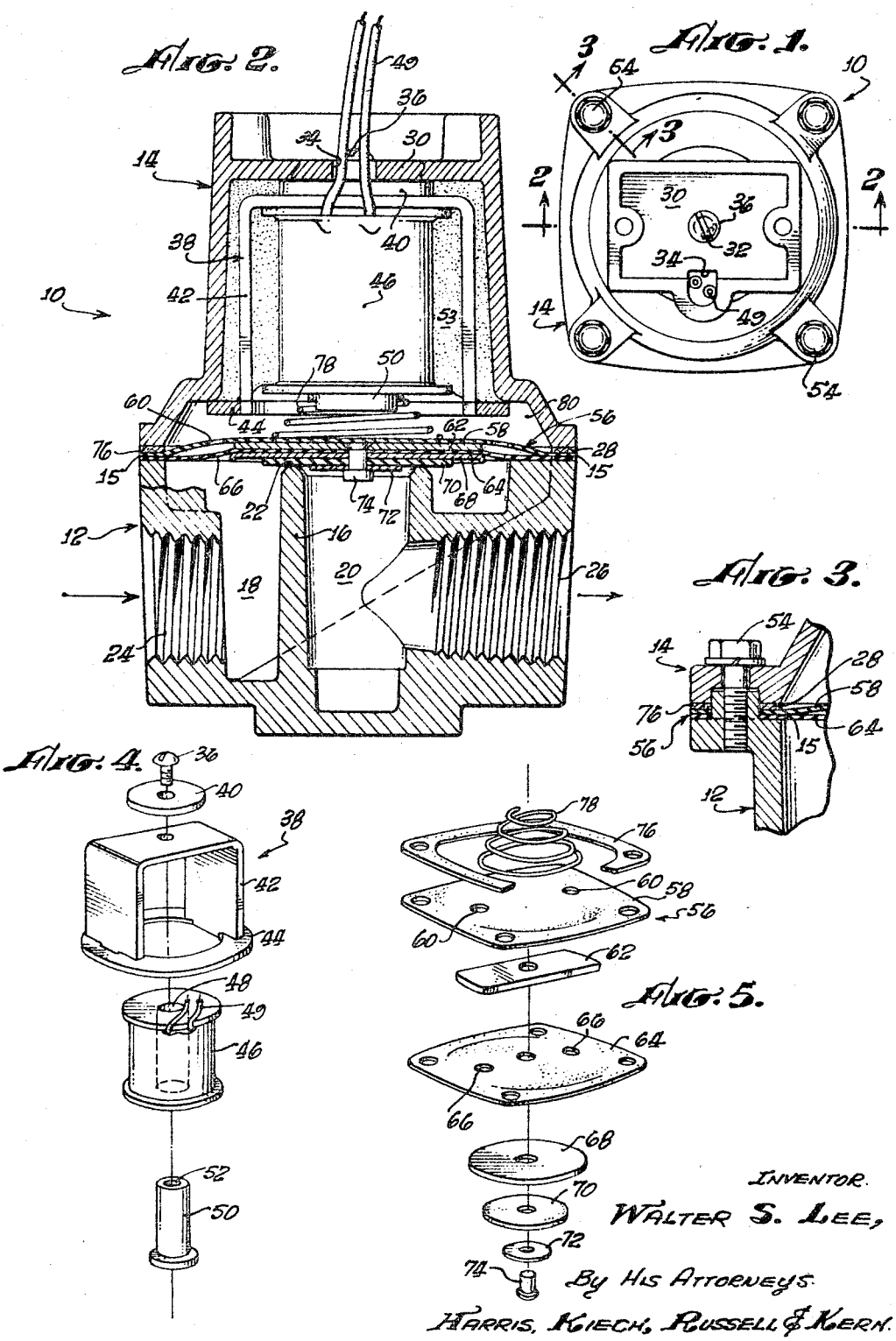

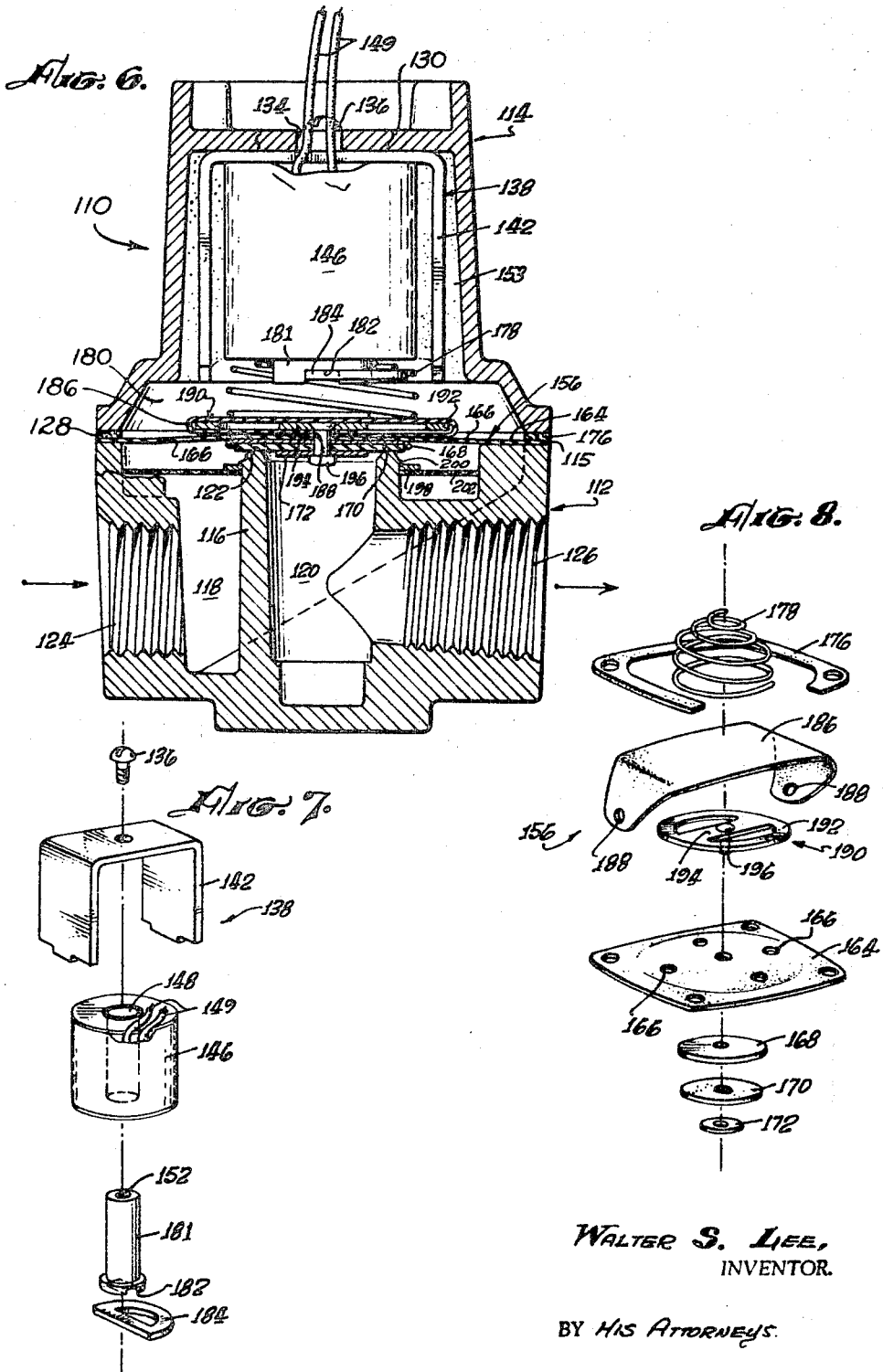

3,269,689
ELECTRO-MAGNETIC DIAPHRAGM VALVE
Walter S. Lee, c/o Major Control Co., P.O. Box 537,
Corona, Calif.
Filed July 1, 1964, Ser. No. 379,597
7 Claims. (Cl. 251—52)

The present invention relates generally to the valve art and more particularly to a novel electro-magnetic diaphragm valve which is adapted to take the place of conventional solenoid-type valves, particularly where used with gas-fired heating equipment.

As is well known among valve manufacturers and users of gas-fired heating equipment, conventional solenoid-type valves have many disadvantages, not the least of which is the noise they make when they move between the closed position and the open position. It is also well known that a conventional solenoid valve must be machined to relatively close tolerances so there is a close fit between the valve and valve seat in the closed position, thereby increasing the cost of manufacturing the valve, but what is perhaps more objectionable, users of gas-fired heating equipment are well aware of the noise which reverberates through the air ducts each time a conventional solenoid valve moves to the open position.

Another disadvantage of the conventional solenoid-type valves is that they are noisy and "hum" due to high current loads, and sometimes they also remain in the open position after being de-energized, thereby causing the appliance to operate continuously.

It is a general object of the present invention, therefore, to provide a novel electro-magnetic diaphragm valve which overcomes all of the aforementioned disadvantages of a conventional solenoid-type valve.

A specific object of the present invention is to provide such a valve which includes a valve member and valve seat which do not require a close fit or a high degree of machining tolerances during the manufacture thereof.

Another specific object is to provide such a valve which is extremely quiet in operation, particularly during the movement from the closed to the open position.

Additional objects are to provide a novel electromagnetic diaphragm valve which is relatively positive in its operation, which requires relatively little maintenance, and which is relatively inexpensive to manufacture.

Further objects and advantages of the present invention will be apparent from the following detailed description, reference being had to the accompanying drawing wherein a preferred embodiment of the present invention is shown.

In the drawing:

FIG. 1 is a top plan view of one form of an electromagnetic diaphragm valve constructed in accordance with the teachings of the present invention, which form is designed for use with D.C. circuits;

FIG. 2 is a vertical sectional view taken on the line 2—2 of FIG. 1;

FIG. 3 is an enlarged fragmentary vertical sectional view taken on the line 3—3 in FIG. 1;

FIG. 4 is an exploded perspective view of the coil assembly of said valve;

FIG. 5 is an exploded perspective view of the diaphragm assembly of said valve;

FIG. 6 is a vertical sectional view similar to FIG. 2 illustrating a second form of electro-magnetic diaphragm valve embodying the teachings of the present invention, which form is designed for use with A.C. circuits;

FIG. 7 is an exploded perspective view of the coil assembly of said second form of valve; and FIG. 8 is an exploded perspective view of the diaphragm assembly of said second form of valve.

Referring to the drawing more particularly by reference numerals, specifically FIG. 2, 10 generally indicates one form of a valve (for D.C. circuits) embodying the teachings of the present invention which includes a valve housing body 12 and a valve housing head 14, both of which are preferably formed from aluminum, as by casting and machining.

The valve housing body 12 includes an upper peripheral edge 15 and an internal cylindrical wall 16 which divides the housing body into an inlet chamber 18 and an outlet chamber 20, the upper extremity of the cylindrical wall providing an annular valve seat 22.

An inlet opening 24 is provided in communication with the inlet chamber 18 and an outlet opening 26 is provided in communication with the outlet chamber 20. Although the inlet and outlet openings are shown as being in axial alignment, it is to be understood that the outlet opening 26 could be located at other positions, e.g. at the bottom of the housing body 12 or at either side thereof, depending upon the job requirements.

The valve housing head 14 includes a bottom peripheral edge 28 which is adapted to mate with the upper peripheral edge 15 of the housing body, as will be described more fully hereinafter. The housing head also includes an upper transverse wall 30 containing a first opening 32 adjacent the center thereof and a second opening 34 adjacent one side.

Mounted within the valve housing head 14, as by means of a machine screw 36 which extends through the first opening 32, is an electro-magnetic motor assembly 38. As shown in FIG. 4, the assembly 38 may include a spacer washer 40, a combination inverted U-shaped frame 42 and ring 44 which are made from a magnetic material such as iron, a wire wound coil 46 with a cavity 48 therein and leads 49 extending therefrom, and a core 50 of magnetic materials such as iron, which core contains a threaded opening 52 at the upper end thereof. It will be noted that in the assembled position (FIG. 2), the core 50 is received within the cavity 48 of the coil 46, the latter is positioned within the inverted U-shaped frame 42, and the entire motor assembly is fastened in position by the machine screw 36 which is engaged with the threaded opening 52 in the core 50. When the motor assembly is mounted within the valve housing head, the leads 49 from the coil extend through the second opening 34, and the interior of the valve housing head 14 above the lower end of the coil 46 is packed with a water and vapor-proof epoxy resin material 53 suitable for electrical use.

As shown in FIGS. 1 and 3, the valve housing head 14 and the valve housing body 12 are fastened together with the peripheral edges 15 and 28 in vertical alignment, as with machine bolts 54.

Fastened between the valve housing head and valve housing body is a diaphragm assembly 56 shown in "exploded" form in FIG. 5. Beginning at the top of the diaphragm assembly itself (FIG. 5), it includes an upper member 58, preferably made from rubber with a fabric base and which may take the form of a flexible diaphragm having one or more vent holes 60 inwardly of the peripheral edge thereof; a rectangular-shaped magnetic plate or armature 62, preferably made from steel; a lower diaphragm member 64 which is also preferably made from rubber with a fabric base and which includes one or more vent holes 66 inwardly of the peripheral edge thereof, but which also includes an opening adjacent the center to receive the fastening means described below; a flat disc member 68 having a depending peripheral edge, preferably made from metal and which functions to maintain the valve assembly in a flat or horizontal position; a flat circular valve member 70 which is adapted to engage the valve seat 22; a retainer 72;

and a rivet 74, preferably made of aluminum. Used with the diaphragm assembly 56 is a gasket 76 and a coiled spring 78.

As shown in FIG. 2, when the diaphragm assembly is installed, the upper end of the rivet 74 is fastened to the magnetic plate 62, thereby fastening together the plate 62, the lower diaphragm member 64, the disc 68, the valve member 70, and the retainer 72.

As shown in FIG. 3, the peripheral edges of the diaphragm members 58 and 64 are held between the edges of the housing head and housing body by the screws 54 with the gasket 76 on top of the upper diaphragm member 58 and with the springs 78 (FIG. 2) positioned between the upper diaphragm member 58 and the ring 44 of the motor assembly.

As will be described more fully hereinafter, the vent holes 60 and 66 could be replaced with a restrictive passageway in the housing head and housing body to provide communication between the inlet chamber 18 and the buffer chamber 80.

The diaphragm assembly therefore further divides the inlet chamber 18 so as to provide a buffer chamber 80 above the diaphragm 58 and on the side of the diaphragm assembly which is removed from the valve seat 22.

It will also be noted that the upper diaphragm member 58 is positioned between the magnetic plate 62 and the core 50, thereby also functioning as a sound-cushioning member between these two members when the valve moves from the closed to the open position, as will be explained more fully hereinafter.

In the closed or inoperative position (FIG. 2), the valve member 70 is held in sealing engagement with the valve seat 22 by the spring 78 regardless of the position of the valve, i.e., whether it is right side or upside down, and, as mentioned hereinabove, the disc 68 maintains the diaphragm assembly in a flattened and flexible position whereby the valve member 70 seats properly on the valve seat 22.

In operation, and assuming the valve is in the closed position shown in FIG. 2, fluid such as gaseous fuel flows through the inlet 24 and into the inlet chamber 18, and thence through the vent holes 66 and 60 in the diaphragms to the buffer chamber 80 above the upper diaphragm member 58. Although the vent holes 60 and 62 are shown as being in registry, they could be offset so as to provide a circuitous passage between the inlet chamber and the buffer chamber 80 above the upper diaphragm member. Also, as mentioned above, a passageway could be provided in the valve housing.

The fluid is prevented from flowing upwardly from the buffer chamber 80 and around the coil 46 by the packed material 53. Thus, there is fluid pressure both above and below the diaphragm assembly 56 but the fluid pressure above the assembly (aiding in maintaining the valve in the closed position) is greater than the fluid pressure below the assembly by the difference in area attributable to the area defined by the valve seat 22.

When the coil 46 is energized, the magnetic plate or armature 62 between the diaphragm members is caused to move to adjacent the lower end of the electro-magnetic core 50 against the action of the spring 78 and the unbalanced fluid pressure, thereby moving the valve member 70 away from the valve seat 22 and permitting fluid to flow into the outlet chamber and thence through the outlet 26.

During the opening operation of this valve there will be no loud noise as normally accompanies the opening of a conventional solenoid valve. This is due to the fact that the upper member 58 (preferably made of rubber with a fabric base) is positioned between the metal armature 62 and the lower end of the core 50, and also because of the entrapment of the fluid in the buffer chamber 80 above the diaphragm members 58 and/or 64, which fluid must escape through the vent holes 60 and/or 66 before the valve can fully open, thereby providing a buffering or cushioning effect as the diaphragm assembly moves toward the core 50. The relatively small mass of the diaphragm assembly 56 also assists in obviating any noise during this opening operation of the valve.

When the coil 46 is de-energized, the magnetic plate or armature 62 is released, thereby permitting the force of the spring 78 to move the diaphragm assembly 56 to the closed position against the pressure of the incoming fluid flow, until the valve member 70 engages the valve seat 22. It will be readily apparent that because the valve member 70 is a flat plate and the periphery thereof extends beyond the valve seats 22, there is no problem of requiring a close fit or close machining tolerances as with conventional solenoid-type valves. Furthermore, the valve member 70 is actually self-centering due to the fact that it is fastened to the lower diaphragm member 64 which in turn has the peripheral edge thereof fastened between the valve housing head 14 and the valve housing body 12 (FIG. 3).

Referring to FIGS. 6 through 8 which show another form of electro-magnetic diaphragm valve constructed in accordance with the teachings of the invention and which is designed particularly for use with A.C. circuits (like parts being indicated by like numbers with 100 added thereto), the second form also includes an electro-magnetic motor assembly 138, which, however, is somewhat different in construction and operation from the motor assembly shown in FIGS. 2 and 4.

Thus, the assembly 138 includes (FIG. 7) a machine screw 136 for supporting it within the valve housing head 114, an inverted U-shaped frame 142 made from a magnetic material such as iron, and a wire wound coil 146 with a cavity 148 therein and leads 149 extending therefrom.

Positioned in the cavity 148 is a core 181 of magnetic material such as iron, which core contains a threaded opening 152 at the upper end thereof and a transversely extending slot 182 at the lower end. The slot 182 receives and supports a "shorted" half turn or shaded pole member 184 preferably made from copper.

As will be described more fully hereinafter, the shaded pole member 184 prevents the device from "chattering" due to the reversal of polarity in the coil 146.

The motor assembly 138 is supported within the valve head by the machine screw 136 and said valve head packed with a suitable water and vapor-proof material 153.

Turning to the diaphragm assembly 156 which is used in the second embodiment of the valve (FIG. 8), it includes a relatively thin buffer member 186 which is preferably made of rubber with a fabric base and which is generally of rectangular shape with openings 188 adjacent the opposed ends thereof. The buffer member is flexible and, in effect, is wrapped around a circular-shaped armature 190 made of magnetic material such as iron. The armature 190 includes a peripheral annular portion 192 and a transversely extending center portion 194. Fastened to the center portion 194 and depending therefrom is a stud 196 which receives the overlapped ends of the buffer member 186 such that the stud 196 projects through the aligned openings 188. Thus, as will be explained more fully hereinafter, the buffer member 186 encloses the armature member 190 and functions as a "buffer" or "bumper" between the armature member and the half-turn or pole member 184 to prevent a "clicking" sound when the diaphragm assembly moves from the closed to the open position.

Positioned below the armature member 190 is a diaphragm member 164 similar in construction to the lower diaphragm member 64 previously described and which includes vent holes 166 inwardly of the peripheral edge thereof.

Also, as in the embodiment first described, below the diaphragm member 164 are a flat disc member 168, a thin circular valve member 170 preferably made of rubber, and a retainer 172 which includes an opening adjacent the center thereof for receiving the lower end of the stud 196, whereby all of the parts of the diaphragm assembly can be fastened together.

The outer peripheral edge of the diaphragm member 164 is fastened between the peripheral edge 128 of the valve housing head 114 and the edge 115 of the valve housing body 112 with the gasket 176 preferably on top of the diaphragm member.

As in the first embodiment, a coiled spring 178 is positioned between the lower end of the coil 146 and the upper portion of the diaphragm assembly.

Either of the embodiments may also include a protective screen assembly as shown in FIG. 6, which assembly comprises an annular retainer member 198 fastened about the upper portion of the cylindrical wall 16, as by "staking" indentations 200, and an annular screen member 202 below the retainer member.

The basic operation of the embodiment shown in FIG. 6 is similar to that of the embodiment first described in that in the closed position of the diaphragm assembly, the valve member 170 is positioned on the valve seat 122 and fluid is contained in the inlet chamber 118 and the buffer chamber 180, the fluid having passed into the buffer chamber through the vent holes 166 in the diaphragm member 164.

When the coil 146 is energized with alternating current so as to produce magnetic flux and attract the armature 190, the fluid trapped within the buffer chamber 180 is forced through the vent holes 166, thereby "cushioning" or slowing down the movement of the valve assembly to the open position so as to prevent the loud noise which usually accompanies the opening of a conventional solenoid valve. Also, the buffer member 186 positioned between the armature member 190 and the half-turn 184 further aids in eliminating any opening noise.

As indicated hereinabove, the function of the "shorted" half-turn 184 is to produce magnetic flux which is out of phase with the main flux produced by the coil 146 so that there is always some magnetic flux in the motor assembly 138 while the coil is energized, even during the time of current reversal, whereby the armature member 190 will continue to be attracted to the core 181 and not "hum" or vibrate when the alternating current reverses in the coil 146

It is to be understood that the embodiment shown in FIGS. 6 through 8 could also employ a restricted passageway between the inlet chamber 118 and the buffer chamber 180 in place of the vent holes 166, and that the embodiment shown in FIGS. 1 through 5 could employ a single diaphragm member as represented by the diaphragm member 58 or the member 64.

Thus, it is apparent that there has been provided several embodiments of a novel electro-magnetic diaphragm valve which fulfill all of the objects and advantages sought therefor, and which valve is extremely quiet in operation as compared with the operation of the conventional solenoid valve.

It is to be understood that the foregoing description and the accompanying drawing have been given only by way of illustration and example and that changes and alterations in the present disclosure which will be readily apparent to one skilled in the art are contemplated as within the scope of the present invention.

I claim:

1. In a valve for controlling the flow of fluid, the combination of:
    a housing;
    a wall within the housing dividing it into an inlet chamber and an outlet chamber;
    an inlet opening into the inlet chamber;
    an outlet opening from the outlet chamber;
    an aperture in said wall for providing communication between the inlet chamber and the outlet chamber with the surface around said aperture providing a valve seat;
    a diaphragm within the inlet chamber adjacent to the valve seat partitioning the inlet chamber and providing a buffer chamber on the side of the diaphragm removed from the valve seat;
    a valve member and an armature carried by said diaphragm,
        the diaphragm being movable between an open position in which the valve member is spaced from the valve seat and a closed position in which the valve member is in sealing engagement with the valve seat;
    restricted passage means interconnecting the buffer chamber and the inlet chamber which is in communication with the inlet opening;
    yieldable means urging the diaphragm toward the closed position; and
    electro-magnetic motor means including a core member in the buffer chamber for co-operation with the armature to move the diaphragm toward the core member from the closed to the open position whereby the valve member is moved away from the valve seat and fluid which is in the buffer chamber is caused to flow therefrom through the restricted passage means to the inlet chamber, said passage means controlling the rate of flow of fluid from the buffer chamber to limit the rate of movement of the diaphragm from the closed position toward the core member.

2. In a valve for controlling the flow of a fluid, the combination of:
    an upper housing member and a lower housing member providing a main chamber therebetween;
    a wall in the lower housing dividing it into an inlet chamber and an outlet chamber;
    an inlet opening into the inlet chamber;
    an outlet opening from the outlet chamber;
    an aperture in said wall providing communication between the inlet chamber and the outlet chamber with the surface surrounding said aperture providing a valve seat;
    a diaphragm extending transversely of said main chamber between the upper housing and the lower housing and providing a buffer chamber in the upper housing which is on the side of the diaphragm removed from the valve seat;
    a plate-like valve member fastened to the diaphragm for engagement with the valve seat, said valve member being larger than the aperture in the wall;
    said diaphragm being movable between an open position in which the valve member is spaced from the valve seat and a closed position in which the valve member is in sealing engagement with the valve seat;
    restricted passage means interconnecting the buffer chamber and the inlet chamber;
    yieldable means urging the diaphragm to the closed position;
    an armature member fastened to the upper surface of the diaphragm;
    electro-magnetic motor means in said upper housing member including a core member in the buffer chamber for co-operation with the armature member to move the diaphragm from the closed to the open position whereby the valve member is moved away from the valve seat and fluid which is in the buffer chamber is caused to flow therefrom through the restricted passage means to the inlet chamber; and
    sound-cushioning means interposed between the armature member and the core member to prevent the armature member from striking the core member when the diaphragm moves from the closed to the open position.

3. In a valve for controlling the flow of a fluid, the combination of:

an upper housing member and a lower housing member providing a main chamber therebetween;
a wall in the lower housing dividing it into an inlet chamber and an outlet chamber;
an inlet opening into the inlet chamber;
an outlet opening from the outlet chamber;
an aperture in said wall providing communication between the inlet chamber and the outlet chamber with the surface surrounding said aperture providing a valve seat;
a diaphragm extending transversely of said main chamber between the upper housing and the lower housing and providing a buffer chamber in the upper housing which is on the side of the diaphragm removed from the valve seat;
a plate-like valve member fastened to the diaphragm for engagement with the valve seat, said valve member being larger than the aperture in the wall;
said diaphragm being movable between an open position in which the valve member is spaced from the valve seat and a closed position in which the valve member is in sealing engagement with the valve seat;
a plurality of small vents in the diaphragm outwardly of the valve seat and spaced substantially uniformly about the valve member providing limited communication between the buffer chamber and the inlet chamber;
yieldable means urging the diaphragm to the closed position;
an armature member fastened to the diaphragm; and
electro-magnetic motor means in said upper housing member and including a core member in the buffer chamber for co-operation with the armature member to move the diaphragm from the closed to the open position whereby the valve member is moved away from the valve seat and fluid which is in the buffer chamber is caused to flow therefrom through the spaced apart vents in the diaphragm to the inlet chamber, said vents controlling the rate of flow of fluid from the buffer chamber to limit the rate of movement of the diaphragm from the closed position toward the core member.

4. In a valve for controlling the flow of a fluid, the combination of:
an upper housing member and a lower housing member providing a main chamber therebetween;
a wall in the lower housing dividing it into an inlet chamber and an outlet chamber;
an inlet opening into the inlet chamber;
an outlet opening from the outlet chamber;
an aperture in said wall providing communication between the inlet chamber and the outlet chamber with the surface surrounding said aperture providing a valve seat;
a diaphragm extending transversely of said main chamber between the upper housing and the lower housing and providing a buffer chamber in the upper housing which is on the side of the diaphragm removed from the valve seat;
a plate-like valve member fastened to the diaphragm for engagement with the valve seat, said valve member being larger than the aperture in the wall;
said diaphragm being movable between an open position in which the valve member is spaced from the valve seat and a closed position in which the valve member is in sealing engagement with the valve seat;
restricted passage means interconnecting the buffer chamber with the inlet chamber;
yieldable means urging the diaphragm to the closed position;
an armature member fastened to the diaphragm adjacent the center thereof, said armature member including an annular outer portion and a transversely extending center portion interconnecting opposed sides of the outer portion;
a metal frame of inverted U-shape positioned in the upper housing member with the lower ends thereof above the diaphragm;
an electro-magnetic coil with a metal core positioned within the metal frame, the lower end of the metal core extending below the lower end of the coil; and
a short-circuited half-turn of electrically conductive material fastened to the lower end of the metal core.

5. In a valve for controlling the flow of a fluid, the combination of:
an upper housing member and a lower housing member providing a main chamber therebetween;
a wall in the lower housing dividing it into an inlet chamber and an outlet chamber;
an inlet opening into the inlet chamber;
an outlet opening from the outlet chamber;
an aperture in said wall providing communication between the inlet chamber and the outlet chamber with the surface surrounding said aperture providing a valve seat;
a diaphragm extending transversely of said main chamber between the upper housing and the lower housing and providing a buffer chamber in the upper housing which is on the side of the diaphragm removed from the valve seat;
a plate-like valve member fastened to the diaphragm for engagement with the valve seat, said valve member being larger than the aperture in the wall;
said diaphragm being movable between an open position in which the valve member is spaced from the valve seat and a closed position in which the valve member is in sealing engagement with the valve seat;
restricted passage means interconnecting the buffer chamber and the inlet chamber controlling the rate of flow of fluid from the buffer chamber to limit the rate of movement of the diaphragm from the closed position to the open position;
electro-magnetic motor means in said upper housing member for moving the diaphragm between the open and the closed positions and including a core member extending into the buffer chamber;
a plate-like armature member fastened to the upper surface of the diaphragm adjacent the center thereof; and
a flexible buffer member of sound-cushioning material enclosing at least a portion of the armature member and extending across the upper surface thereof between the armature member and the core member to prevent the armature member from striking said core member.

6. In a valve for controlling the flow of a fluid, the combination of:
an upper housing member and a lower housing member providing a main chamber therebetween;
a wall in the lower housing dividing it into an inlet chamber and an outlet chamber;
an inlet opening into the inlet chamber;
an outlet opening from the outlet chamber;
an aperture in said wall providing communication between the inlet chamber and the outlet chamber with the surface surrounding said aperture providing a valve seat;
a diaphragm extending transversely of said main chamber between the upper housing and the lower housing and providing a buffer chamber in the upper housing which is on the side of the diaphragm removed from the valve seat;
a plate-like valve member fastened to the diaphragm for engagement with the valve seat, said valve member being larger than the aperture in the wall;
said diaphragm being movable between an open position in which the valve member is spaced from the valve seat and a closed position in which the valve member is in sealing engagement with the valve seat;
restricted passage means interconnecting the buffer chamber and the inlet chamber controlling the rate of flow of fluid from the buffer chamber to limit the rate of movement of the diaphragm from the closed position to the open position;

electro-magnetic motor means in said upper housing member for moving the diaphragm between the open and the closed positions and including a core member extending into the buffer chamber;

a plate-like armature member fastened to the upper surface of the diaphragm by means of a stud-like member which passes through said diaphragm member; and an elongated, flat buffer member of sound-cushioning material having opposed ends wrapped around said armature member with the ends thereof overlapping between the armature member and the diaphragm, said stud-like member extending through the overlapped ends of the buffer member.

7. In a valve for controlling the flow of a fluid, the combination of:

an upper housing member and a lower housing member providing a main chamber therebetween;

a wall in the lower housing dividing it into an inlet chamber and an outlet chamber;

an inlet opening into the inlet chamber;

an outlet opening from the outlet chamber;

an aperture in said wall providing communication between the inlet chamber and the outlet chamber with the surface surrounding said aperture providing a valve seat;

a diaphragm extending transversely of said main chamber between the upper housing and the lower housing and providing a buffer chamber in the upper housing which is on the side of the diaphragm removed from the valve seat;

a plate-like valve member fastened to the diaphragm for engagement with the valve seat, said valve member being larger than the aperture in the wall;

said diaphragm being movable between an open position in which the valve member is spaced from the valve seat and a closed position in which the valve member is in sealing engagement with the valve seat;

restricted passage means interconnecting the buffer chamber and the inlet chamber controlling the rate of flow of fluid from the buffer chamber to limit the rate of movement of the diaphragm from the closed position to the open position;

electro-magnetic motor means in said upper housing member for moving the diaphragm between the open and the closed positions and including a core member extending into the buffer chamber;

a plate-like armature member fastened to the upper surface of the diaphragm by means of a stud-like member which passes through the diaphragm member, said armature member including an annular outer portion and a transversely extending center portion interconnecting opposed sides of the outer portion; and an elongated, flat buffer member of sound-cushioning material having opposed ends wrapped around said armature member with the ends thereof overlapping between the armature member and the diaphragm, said stud-like member extending through the overlapped ends of the buffer member.

References Cited by the Examiner

UNITED STATES PATENTS

| 2,461,772 | 2/1949 | Ray | 251—129 |
| 2,465,036 | 3/1949 | Ray | 251—129 |
| 2,888,233 | 5/1959 | Windsor | 251—30 |
| 2,911,183 | 11/1959 | Matthews et al. | 251—137 |

FOREIGN PATENTS

| 1,249,931 | 11/1960 | France. |
| 5,030 | 4/1888 | Great Britain. |

M. CARY NELSON, *Primary Examiner.*

A. ROSENTHAL, *Assistant Examiner.*